June 29, 1965
R. W. DODGE
3,191,987
REINFORCED CAB CONSTRUCTION WITH ADJUSTABLE
CLOSURE PANEL ARRANGEMENT
Filed March 18, 1964
3 Sheets-Sheet 1
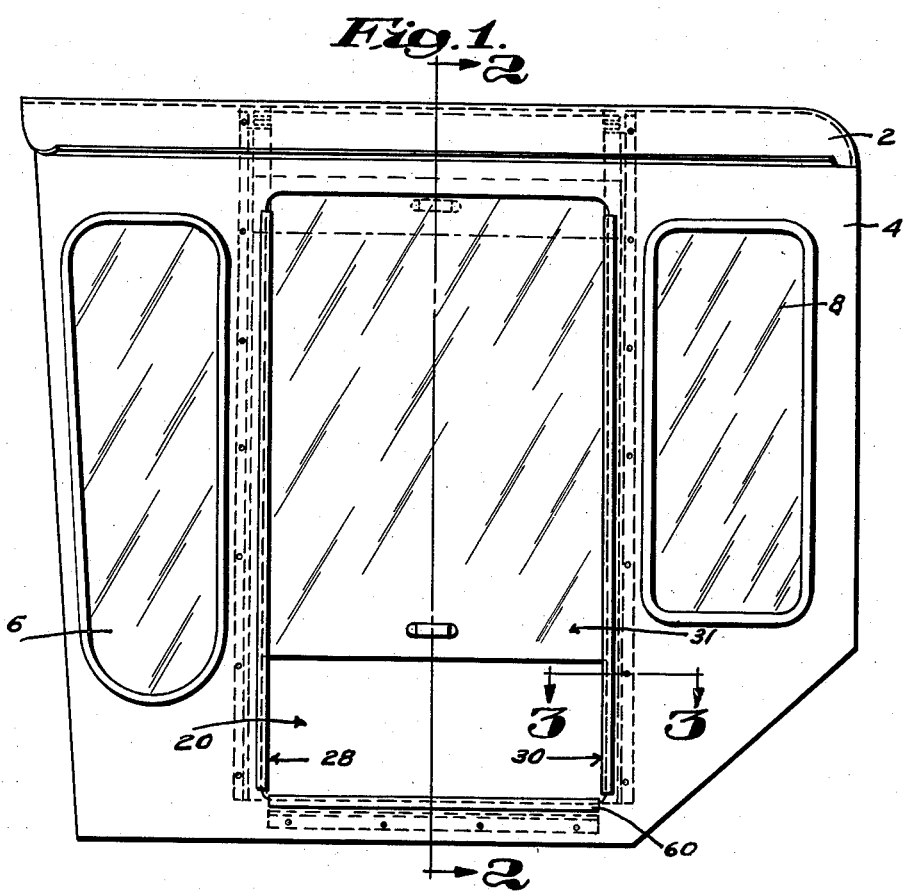
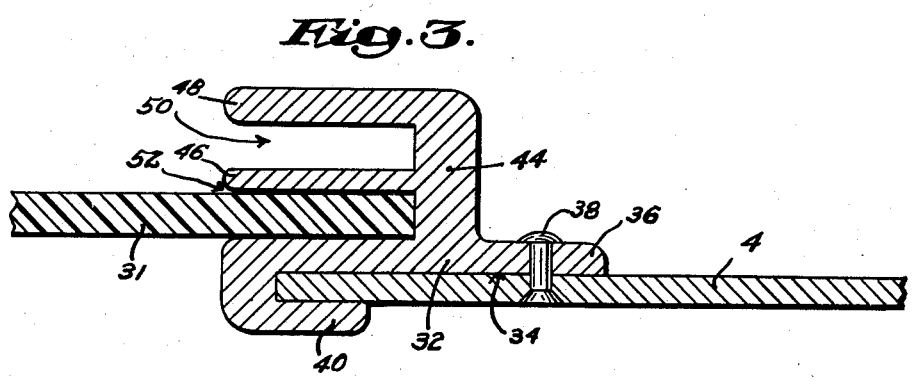
Inventor:
Robert W. Dodge,
by Munroe H. Hamilton
Attorney

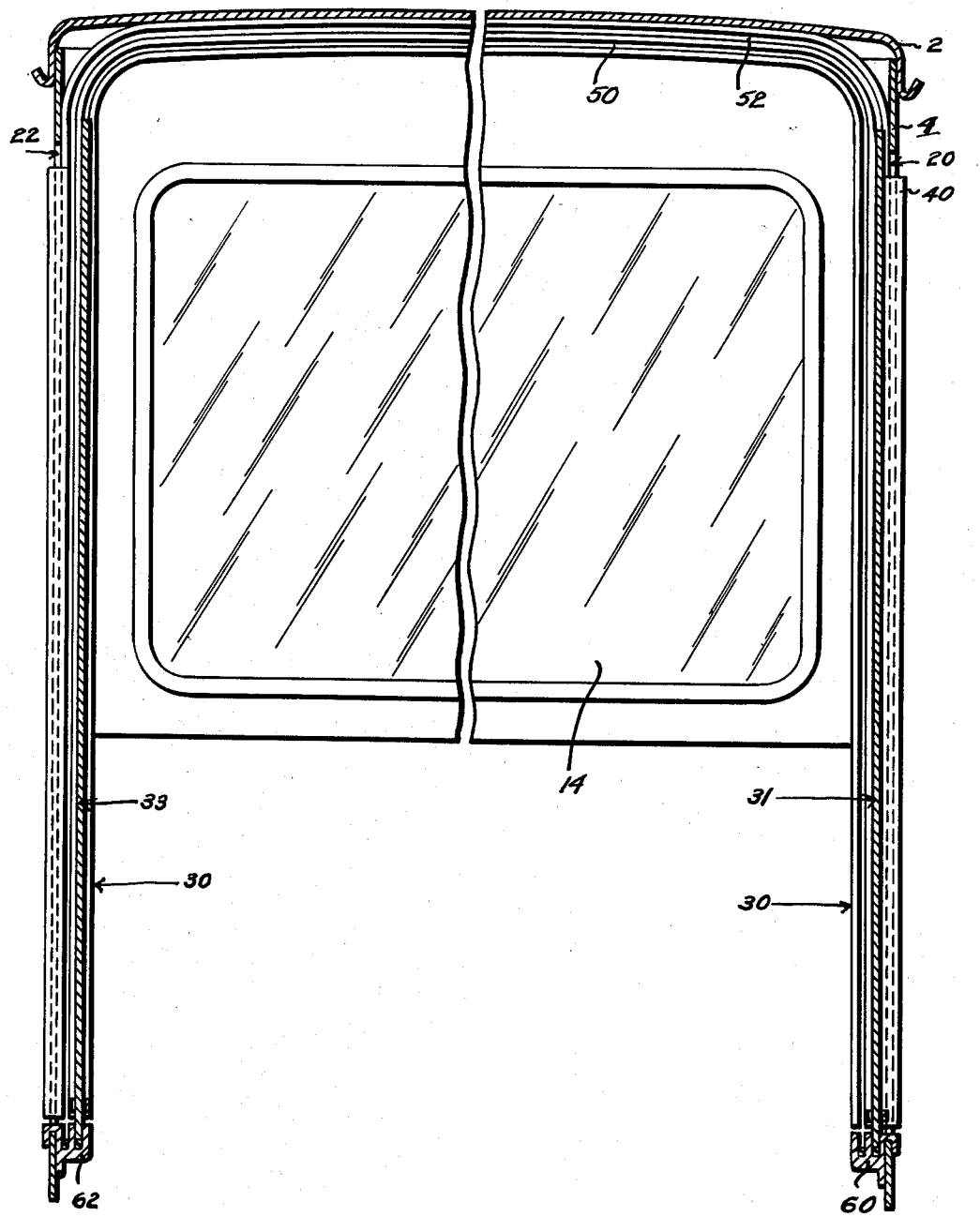

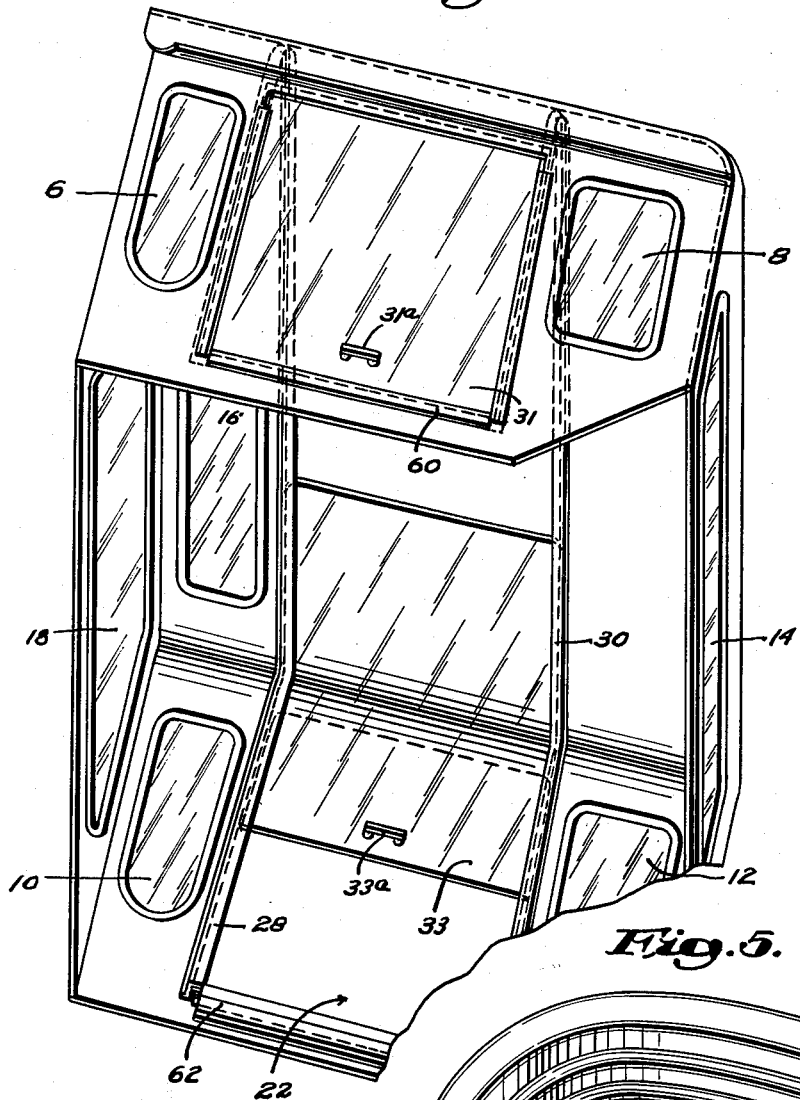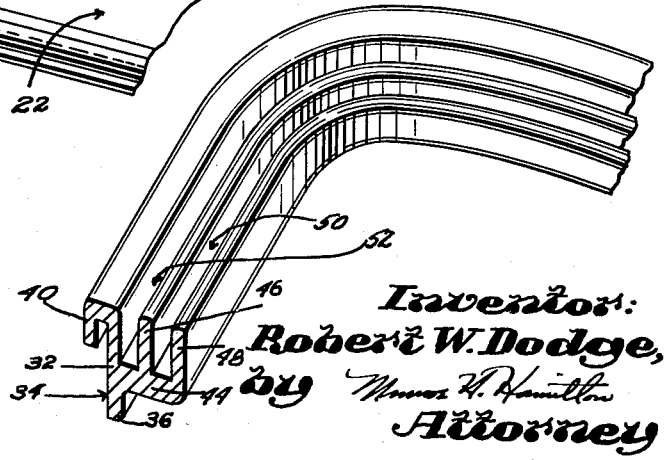

United States Patent Office 3,191,987
Patented June 29, 1965

3,191,987
REINFORCED CAB CONSTRUCTION WITH ADJUSTABLE CLOSURE PANEL ARRANGEMENT
Robert W. Dodge, 40 Pleasant St., Wenham, Mass.
Filed Mar. 18, 1964, Ser. No. 352,775
2 Claims. (Cl. 296—102)

This invention relates to enclosure bodies of the type which can be installed quickly on machines such as tractors and the like. Enclosure bodies of this class are commonly referred to as demountable cab members and are widely used for sheltering tractor operators during bad weather conditions.

Difficulty is experienced in providing a sufficiently rigid cab body which will include a windshield and access openings which can be conveniently closed when the operator is in the cab. One problem arises when relatively heavy sheet metal is used since the weight of the cab is undesirably increased and it is more difficult to install and remove the cab from time to time. If, however, very thin sheet metal is used there is a lack of durability and rigidity and the cab fails to provide a satisfactory sheltering enclosure. Moreover, the problem of providing doors or windows for opening and closing the access passageways is greater when using relatively light weight sheet metal such as may be desired.

It is a principal object of the invention to devise an improved cab body which can be made of relatively light weight sheet metal and in which suitable access openings are provided in combination with novel closure panel members. It is also an object of the invention to provide a cab body construction in which novel reinforcing frame means are employed for not only supporting the closure panels, but also for imparting a high degree of rigidity to a cab body made of relatively light sheet material. Still another object is to provide a unique storage archway in which closure panels can be contained when not in use.

In order to realize these several objectives noted in a sheet metal type of cab body construction, I have conceived of a combination of flexible closure panels slidably supported in channeled framing members which extend around the inside of the cab body with intermediate portions being arched and solidly secured to the inside of the roof of the cab.

I have further devised a specially shaped channeled framing structure which can be cut into suitable lengths and shaped to conform to the contour of the inside of the cab body so that reinforcing posts and arched portions are provided which develop an exceedingly high degree of rigidity and strength with a minimum of material employed.

In addition, the channeled framing structure includes a dual channeling arrangement by means of which a storage archway is produced at the inside of the roof section of the cab and in this storage archway both of the flexible closure panels may be contained when not in use.

The nature of the invention and its other objects and novel features will be more fully understood and appreciated from the following description of a preferred embodiment of the invention selected for purposes of illustration and shown in the accompanying drawings, in which:

FIGURE 1 is a side elevational view showing the improved cab construction of the invention;

FIGURE 2 is a cross section taken on the line 2—2 of FIGURE 1;

FIGURE 3 is an enlarged detail cross section of novel channeling means employed in the invention;

FIGURE 4 is a perspective view of the cab as viewed from the inside; and

FIGURE 5 is a detail elevational view showing fragmentarily an arched portion of one of the frame members employed in the invention.

The principal parts of my improved cab construction include an enclosure body, special channeled framing members secured to the cab body and a pair of flexible closure panels slidably disposed in the channeled framing members. The body portion may be of any desired construction and one preferred embodiment is made of a relatively light sheet material such as thin gauge steel.

In the structure shown in the drawings, numeral 2 denotes a top or roof section which is welded or otherwise secured over the unitary sidewall section 4. However, it should be understood that the invention is not intended to be limited to this two-piece body or any other particular arrangement of body parts.

The sidewall section 4 is provided with windows as 6, 8, 10, 12, 14 and 16 and a windshield 18 as is more clearly illustrated in FIGURE 4. The sidewall section 4 is further recessed to provide two opposite access openings 20 and 22 which are of a size designed to provide entrance ways on two sides of the cab body through which an operator may enter and leave the cab as desired.

In accordance with the invention, I combine with the cab body described a pair of specially formed channeled framing members 28 and 30 which are located along the edges of the access openings and extend upwardly inside of the cab body in a manner suggested in FIGURE 2. These channeled framing members support a pair of flexible translucent closure panels 31 and 33. Each of the channeled framing members are preferably of the same cross sectional shape and are designed to be manufactured and furnished in desired lengths cut off from relatively longer lengths of channeled framing stock. The closure panels may be any commonly known synthetic resin of translucent flexible nature as one example of which there may be cited a flexible vinyl resin referred to as vinyl plastic formed by copolymerization of vinyl chloride and vinyl acetate in the well-known manner.

A typical cross section of the channeled framing stock is illustrated in FIGURE 3 and as will be observed from an inspection of this figure several component parts are combined in one integral body. These component parts include a base part 32 which has a flat inner surface 34 which terminates along one edge in a thin anchoring flange 36 through which flange fastenings as 38 may be employed to solidly secure the channeled framing member to the cab body section 4.

Along its opposite side the base part 32 is formed with a reversely extending molding 40 which is designed to provide a groove into which an edge of one of the access openings may be snugly engaged as suggested in FIGURE 3. Extending outwardly from the base part 32 at points intermediate the molding and anchoring flange is a channel rib 44 which is formed with spaced channel strips 46 and 48 extending at right angles as shown in FIGURE 3 to define spaced apart channels 50 and 52.

It is pointed out that the arrangement of the channel rib 44 and channel strips 46 and 48, relative to the base part 32, is so chosen that it becomes possible to form or shape the channel rib into a curved or arched shape without appreciably changing the width of the channels 50 and 52. There is also provided a flat engaging surface 34 together with the molding 40, which molding may be cut off at any desired point where, for example, an access opening terminates.

In the cab construction of the invention advantage is taken of these channeled framing features to perform several desirable functions. As shown in FIGURE 2 the channeled framing member 30 is arranged with its intermediate portion shaped to the inner contour of the cab roof to provide a slightly arched portion as indicated. This arched portion is solidly secured to adjacent roof surfaces by welding or other means and constitutes an excellent reinforcing member for imparting the rigidity and strength to the roof, as well as solidly locking together the roof and sidewall parts.

It will be understood that a similar reinforcing effect is realized with the frame member 28 and it will also be apparent that by spacing the channeled framing members apart a suitable distance to receive opposite edges of the flexible closure panels 31 and 33 these members may be slidably contained with a slight frictional engagement in respective channels 52 and 50. It is also pointed out that the panels may be conveniently inserted and removed at the bottoms of the channeled framing sections to thus provide for replacement, repairs or other purposes.

Still another function of the frame channeled members is to provide a unique storage archway into which the closure panels may be raised for storage purposes when not in use. Attention is directed to FIGURE 2 in which it will be observed that the panel 31 is normally supported in a closed position being vertically disposed in the channel 52. Similarly, the closure panel 33 is vertically disposed in the channel 50 which occurs below the channel 50 at the roof portions of the cab. By merely sliding these closure panels upwardly in their respective grooves or channels they can be stored in a convenient position as has been suggested in FIGURE 4 wherein the closure panel 31 is shown in a closed position and the closure panel 33 is shown in a raised position. To facilitate raising and lowering the closure panels there may be provided handles 31a and 33a. It will also be observed that the molding part 40 is cut away at the top of the access openings 20 and 22 in order to permit the remainder of the channel framing body to extend upwardly inside of the cab body.

FIGURE 5 illustrates fragmentarily the channeled framing in a shaped or curved position and more clearly indicating that the channels 50 and 52 are maintained of approximately the same width when curved into the shape indicated.

As noted in FIGURES 1 and 4 lengths of the channeled framing may also be employed to provide a molding for the horizontal edges of the access openings and these horizontal framing members are indicated by the numerals 60 and 62. It should be noted that these horizontal framing members may be arranged to fit snugly against the vertical framing members to provide a tightly fitted arrangement of the parts and in a fully closed positon of the closure panels and bottom edges will fit into the panels or grooves of the respective horizontal framing members. The arrangement of the channeled framing in both horizontal and vertical positions provide a desirable finished molding appearance to the exterior of the cab and also operates to cover any unfinished edges of the sheet metal body.

From the above description of the invention, it will be evident that I have provided a novel combination of parts which function to combine strength and lightness with a machine and ease of operation greatly facilitating entrance into and out of the cab body realized with a high degree of durability and attractive appearance. Changes in the formation of the cab body and the association of the channeled framing members therewith may be varied in accordance with the scope of the appended claims.

What is claimed as new is:

1. A demountable cab body for tractors and the like, said cab body comprising a relatively thin unitary sheet metal sidwall section and a relatively thin sheet metal top section secured to the upper portion of the sidewall section to form a flexible cab body of extremely lightweight, said sidewall section being recessed to form two opposite access openings, a pair of arched channeled framing members secured to the inner surface of the top section in spaced apart relation to one another to constitute roof frames for imparting rigidity to the said top section and solidly joining the top section to the said sidewall section, said channeled framing members extending vertically downwardly over the edges of the access apertures in snugly fitted relationship therewith and presenting outer U-shaped frame portions which overlap the outer surfaces of the access openings to provide external sidewall section stiffening, said channeled framing members also extending internally along the inside of the sidewall section members for an appreciable distance to provide relatively wide innner wall stiffening areas, said channeled framing means being still further formed with anchoring flanges and fastenings driven through the anchoring flanges and adjacent sidewall sections to solidly lock these parts together and said channeled framing members being recessed to present two parallel guideways extending all the way around the interior side walls and top of the cab body, a pair of flexible closure members slidably supported in the guideways for closing the said door apertures in a fully lowered position and movable into the arched portions of the channeled framing members to uncover the said access openings.

2. A structure as defined in claim 1 in which the said two parallel giudeways occur with a length such that free edges thereof lie in the same plane with an edge of the U-shaped portions.

References Cited by the Examiner

UNITED STATES PATENTS

| | | |
|---|---|---|
| 498,071 | 5/93 | Moore. |
| 1,601,130 | 9/26 | Maise _____ 296—44 X |
| 2,114,896 | 4/38 | Axe. |
| 2,160,099 | 5/39 | Zeligman et al. _____ 296—47 |
| 2,519,386 | 8/50 | Loving. |
| 2,565,919 | 8/51 | Hill _____ 296—102 X |
| 2,583,918 | 1/52 | Wilson _____ 296—102 |
| 2,972,044 | 2/61 | Smith. |

FOREIGN PATENTS 21,734   7/30   Australia.

A. HARRY LEVY, *Primary Examiner.*